(12) United States Patent
Wang et al.

(10) Patent No.: US 10,915,369 B2
(45) Date of Patent: Feb. 9, 2021

(54) REWARD-BASED ADMISSION CONTROLLER FOR RESOURCE REQUESTS IN THE CLOUD

(71) Applicant: International Business Machines Corporation, Armonk, NY (US)

(72) Inventors: Chen Wang, Chappaqua, NY (US); Ali Kanso, Elmsford, NY (US); Stefania V. Costache, White Plains, NY (US); Alaa S. Youssef, Valhalla, NY (US); Malgorzata Steinder, Leonia, NJ (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 16/204,108

(22) Filed: Nov. 29, 2018

(65) Prior Publication Data
US 2020/0174842 A1    Jun. 4, 2020

(51) Int. Cl.
*G06F 15/16*    (2006.01)
*G06F 9/50*    (2006.01)
(Continued)

(52) U.S. Cl.
CPC .......... *G06F 9/5072* (2013.01); *G06F 9/5077* (2013.01); *H04L 47/78* (2013.01);
(Continued)

(58) Field of Classification Search
CPC ................. G06F 9/5072; G06F 9/5077; G06F 2209/501; G06F 2209/5013;
(Continued)

(56) References Cited

U.S. PATENT DOCUMENTS 8,230,107 B2    7/2012  Tantawi
8,380,551 B2 *  2/2013  Coffman .......... G06Q 10/06312
                                              705/7.12
(Continued)

FOREIGN PATENT DOCUMENTS

EP    3032417 A1    6/2016

OTHER PUBLICATIONS

Bernstein, D., "Containers and cloud: From lxc to docker to kubernetes", IEEE Cloud Computing, vol. 1, No. 3, pp. 81-84, 2014.
(Continued)

*Primary Examiner* — Moustafa M Meky
(74) *Attorney, Agent, or Firm* — Andrew Aubert

(57) ABSTRACT

Technology for selecting job characteristics to determine the similarity among jobs in terms of performance. Technology based on similarity among jobs calculated by selected characteristics for determining jobs that are likely to lead to successful performance of a requested new job by a cloud. Also, technology based on similarity among jobs calculated by selected characteristics for determining jobs that are likely to lead to failure when performing a requested new job by the cloud. When the new job request is accepted, because its characteristics of the new job matches job characteristics characterized by success and/or fails to match job characteristics characterized by failure, then the new job is said to lead to a "reward" or an "expected reward" because the new job will be rewarded by being allowed to use, by an admission controller of a cloud management system, use of cloud computing resources of the cloud.

18 Claims, 10 Drawing Sheets

(51) Int. Cl.
*H04L 29/08* (2006.01)
*H04L 12/911* (2013.01)
(52) U.S. Cl.
CPC ............ *H04L 67/10* (2013.01); *H04L 67/327* (2013.01); *G06F 2209/501* (2013.01); *G06F 2209/503* (2013.01); *G06F 2209/5013* (2013.01)
(58) Field of Classification Search
CPC . G06F 2209/503; H04L 67/10; H04L 67/327; H04L 47/78
USPC ........................................................ 709/226
See application file for complete search history.

(56) References Cited

U.S. PATENT DOCUMENTS

| | | | |
|---|---|---|---|
| 8,606,897 B2 | 12/2013 | Ferris | |
| 8,768,875 B2 | 7/2014 | Xiong | |
| 9,391,919 B2 | 7/2016 | Doganata | |
| 9,557,792 B1* | 1/2017 | Potlapally | G06F 1/3206 |
| 9,860,190 B2 | 1/2018 | Doganata | |
| 10,305,759 B2* | 5/2019 | Clemm | H04L 41/0803 |
| 10,404,548 B2* | 9/2019 | Pignataro | H04L 41/5009 |
| 10,429,921 B2* | 10/2019 | Potlapally | G06F 9/5094 |
| 2004/0114514 A1 | 6/2004 | Ghosal | |
| 2011/0044308 A1* | 2/2011 | Kawamura | H04W 76/23 370/338 |
| 2013/0031035 A1 | 1/2013 | Jeanne | |
| 2016/0197799 A1* | 7/2016 | Clemm | H04L 43/06 709/202 |
| 2017/0139462 A1* | 5/2017 | Potlapally | G06F 1/26 |
| 2018/0115551 A1* | 4/2018 | Cole | H04L 41/0893 |
| 2018/0131631 A1 | 5/2018 | Doganata | |
| 2019/0289038 A1* | 9/2019 | Li | G06N 20/00 |
| 2019/0372864 A1* | 12/2019 | Pignataro | H04L 41/5009 |

OTHER PUBLICATIONS

Hightower et al., "Kubernetes: Up and running dive into the future of infrastructure", 2017, 74 pages.
Rouse, M., "Docker swarm", 2016, 10 pages.
Sutton et al., Reinforcement learing: An introduction, MIT press Cambridge, 1998, vol. 1, No. 1., 6 pages.
Tran et al., "Revised DBSCAN algorithm to cluster data with dense adjacent clusters", Chemometrics and Intelligent Laboratory Systems, vol. 120 (2013) 92-96, Elseveir.
Elek et al., "Admission Control Based on End-to-End Measurements", IEEE INFOCOM 2000, 8 pages.
Matsuki et al., "Admission Control of API Requests in OpenStack", 978-3-901882-89-0 @2017 IFIP, 2017 IFIP/IEEE International Symposium on Integrated Network Management (IM2017), 9 pages.
Wu et al., "SLA-based admission control for a Software-as-a-Service provider in Cloud computing environments", Journal of Computer and System Sciences 78 (2012) 1280-1299.

* cited by examiner

REWARD-BASED ADMISSION CONTROLLER FOR RESOURCE REQUESTS IN THE CLOUD

BACKGROUND

The present invention relates generally to the field of cloud management systems (CMSs), and more particularly to admission controllers in CMSs.

A cloud management system is a program and/or platform that provides for cloud management. Cloud management is the management of cloud computing products and services. Public clouds are typically managed by public cloud service providers, which include the public cloud environment's servers, storage, networking and/or data center operations. Sometimes public cloud services may be managed with a third-party cloud management tool. Public cloud services are typically implemented under one of the following three cloud provisioning categories: (i) user self-provisioning, where customers purchase cloud services directly from the provider, typically through a web form or console interface and typically the customer pays on a per-transaction basis; (ii) advanced provisioning, where customers contract in advance a predetermined amount of resources, which are prepared in advance of service, and the customer typically pays a flat fee or periodically recurring fee; or (iii) dynamic provisioning, where the provider allocates resources when the customer needs them, then decommissions the allocated resources when they are no longer needed, and the customer is typically charged on a pay-per-use basis. Managing a private cloud typically makes use of software tools to: (i) help create a virtualized pool of compute resources; (ii) provide a self-service portal for end users; and (iii) manage security, resource allocation, tracking and billing. Management tools for private clouds are typically service driven, rather than resource driven. This is because cloud environments are typically highly virtualized and organized in terms of portable workloads. In hybrid cloud environments, compute, network and storage resources typically must be managed across multiple domains, so management strategy typically defines what needs to be managed, the location from which management is provided, and the manner of management. Policies to help govern these domains typically include: (i) configuration and installation of images; (ii) access control; and (iii) budgeting and reporting.

OpenStack (also known as O~S) is an open-source software platform for cloud computing, mostly deployed as infrastructure-as-a-service (IaaS), whereby virtual servers and other cloud-based computing and/or data communication resources are made available to customers. The software platform of OpenStack includes interrelated components that control hardware pools of processing, storage, and networking resources supplied by multiple vendors. Users typically manage OpenStack through one, or more, of the following expedients: (i) a web-based dashboard; (ii) command-line tools, or (iii) RESTful web services.

Kubernetes is an open-source container-orchestration system for automating deployment, scaling and management of containerized applications. It aims to provide a platform for automating deployment, scaling, and operations of application containers across clusters of hosts. Kubernetes works with a range of container tools, including Docker.

Apache Mesos is an open-source project to manage computer clusters. Some version(s) of Mesos the ability to centrally supply Docker, rkt and appc instances. Mesos uses Linux cgroups to provide isolation for CPU, memory, I/O and file system.

Docker Swarm (sometimes herein more simply referred to as "Swarm") is an open-source container orchestration platform and is the native clustering engine for and by Docker. Swarm utilizes the same command line from Docker. Swarm typically converts a pool of Docker hosts into a virtual, single host. Applications can be deployed as micro-services or services in a swarm cluster in Docker Swarm. A node joining a swarm cluster typically generates an overlay network for services that span every host in the docker swarm and a host-only docker bridge network for containers. Swarm manager nodes in Docker Swarm are responsible for the entire cluster and handle the worker nodes' resources. Swarm mode includes a DNS element that can be utilized for distributing incoming requests to a service name. Services can be assigned automatically or can run on ports specified by the user.

As the term is used herein, an admission controller is a piece of code that implements admission control policies with respect to requests for cloud computing resources submitted to a CMS. Admission control is the validation process to check whether the cloud system has sufficient current resources to serve an incoming request. The serving of an incoming request implies executing pre-defined operations, which generally relate to resource provisioning and management. Admission control is used in Cloud management systems to accept or reject API requests based on criteria like resource availability, system health, desired quality of service (QoS), security concerns. These requests include, but are not limited to, requests to provision virtualized resources such as virtual machines, virtual storage, virtual networks, etc., or requests of starting applications, containers, services, etc.

SUMMARY

According to an aspect of the present invention, there is a method, computer program product and/or system that performs the following operations (not necessarily in the following order): (i) receiving a successfully-completed job historical data set including information indicative of a plurality of successfully-completed jobs that have been successfully completed by a cloud, with each successfully-completed job including a plurality of associated job parameter values respectively corresponding to a plurality of job parameters; (ii) creating a successfully-completed job cluster definition based upon the successfully completed-job historical data set, with the successfully-completed job cluster definition including a plurality of successfully-completed job parameters, and, for each successfully-completed job parameter, an associated range of qualifying parameter values; (iii) receiving a new job request data set including plurality of new job characteristics respectively corresponding to the plurality of successfully-completed job characteristics; (iv) for each given new job characteristics respectively corresponding to a given job characteristics of successfully-completed jobs, determining that the given new job characteristics are similar to characteristics associated the given successfully-completed jobs; and (v) responsive to the determination of the similarity between jobs based on job characteristics, accepting, by an admission controller of a cloud management system, a new job corresponding to the new job request data for performance by the cloud.

DETAILED DESCRIPTION

Figure 1:
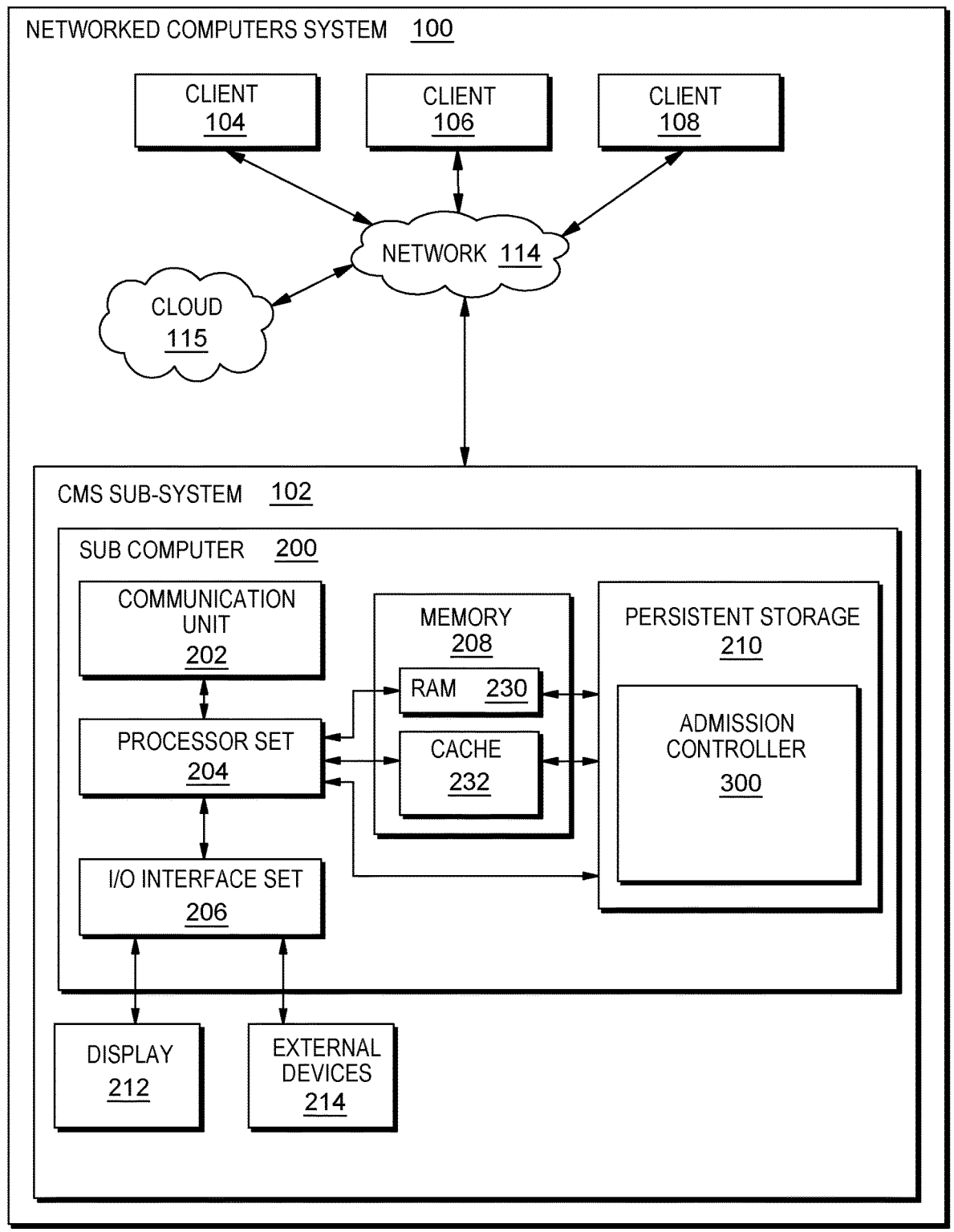
FIG. 1 is a block diagram view of a first embodiment of a system according to the present invention.

Some embodiments of the present invention are directed to determining clusters of new job characteristics (that is, parameter value ranges of selected parameters) that are likely to lead to successful performance of a requested new job by a cloud. Some embodiments of the present invention are directed to determining clusters of new job characteristics (that is, parameter value ranges of selected parameters) that are likely to lead to failure when performing a requested new job by the cloud. When the new job request is accepted, because its characteristics of the new job matches job characteristics characterized by success and/or fails to match job characteristics characterized by failure, then the new job is said to lead to a "reward" or an "expected reward" because the new job will be rewarded by being allowed to use, by an admission controller of a cloud management system, use of cloud computing resources of the cloud. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: CMS sub-system 102; Client sub-systems 104, 106, 108; communication network 114; Cloud 115; CMS computer 200; communication unit 202; processor set 204; input/output (I/O) interface set 206; memory device 208; persistent storage device 210; display device 212; external device set 214; random access memory (RAM) devices 230; cache memory device 232; and Admission Controller 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Admission Controller 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Admission Controller 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Admission Controller 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, Admission Controller 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
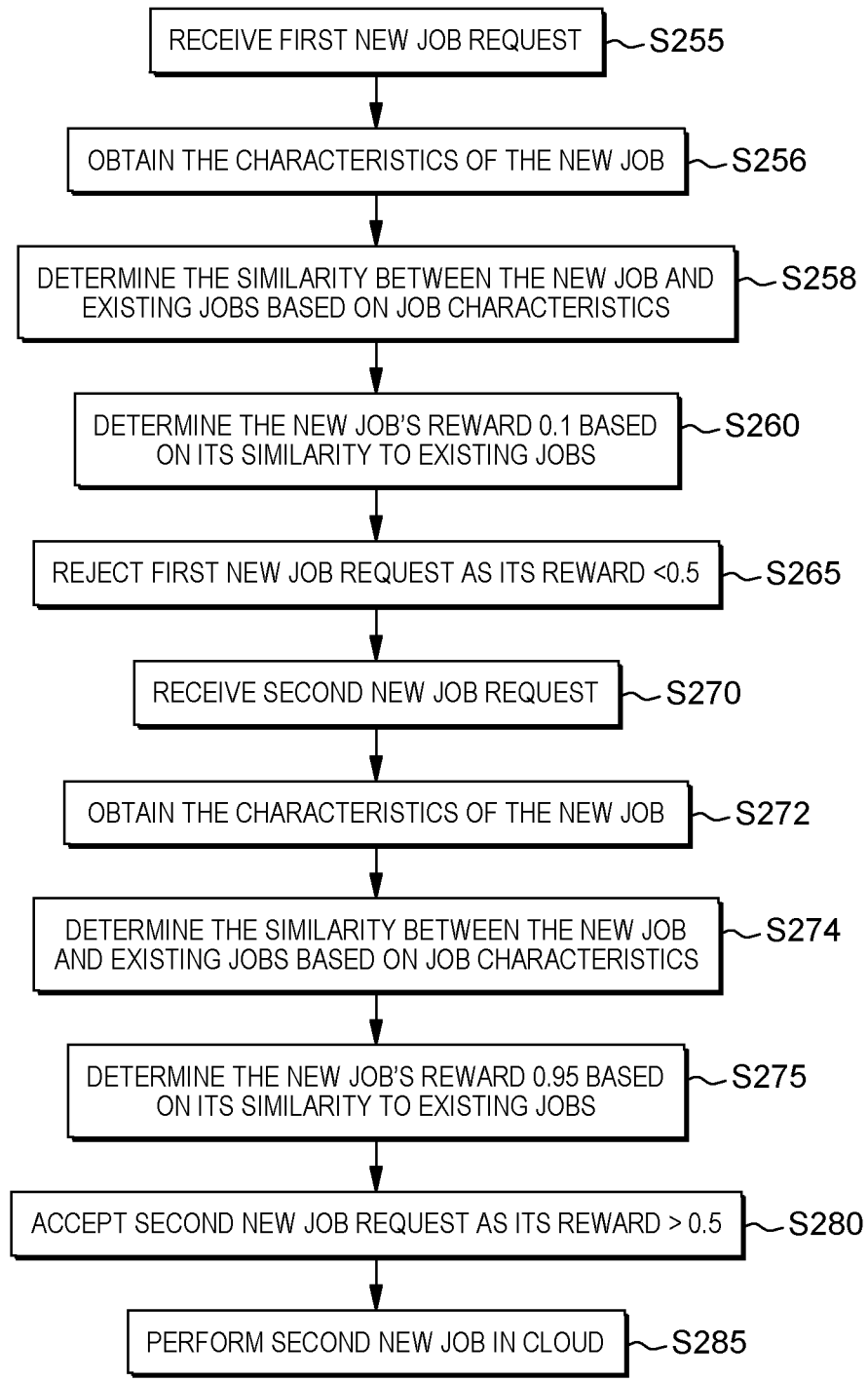
FIG. 2 is a flowchart showing a first embodiment method performed, at least in part, by the first embodiment system.
Figure 3:
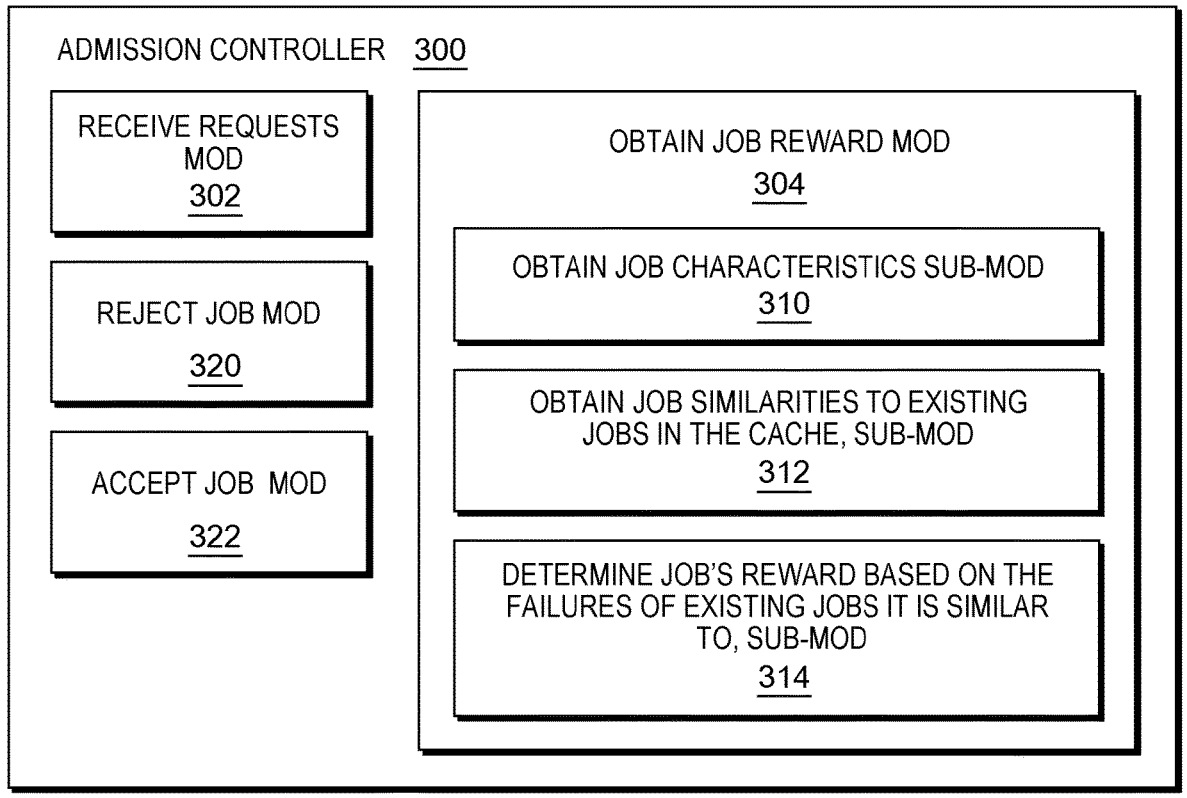
FIG. 3 is a block diagram showing a machine logic (for example, software) portion of the first embodiment system.

FIG. 2 shows flowchart 250 depicting a method according to the present invention. FIG. 3 shows Admission Controller 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where Receive Requests module ("mod") 302 receives a first new job request for a job to be performed on Cloud 115 of FIG. 1. In this example embodiment, the first new job request is a request from Client 104 of FIG. 1 for translating all entries of a first client database into binary data, to facilitate providing the first client database into a machine learning algorithm.

Processing proceeds to operation S256 of FIG. 2, where job characteristics are obtained. Obtain job reward mod 304 determines the reward of the job based on its similarity to existing jobs via comparing their characteristics and if the first new job request was accepted for performance on Cloud 115 of FIG. 1. In this simplified example embodiment, the job has the following characteristics: (i) 5 file handlers; (ii) stack size limit of 1024 kilobytes; and (iii) a process identifiers threshold of 3; (iv) the client ID x; (v) the job type y. In this example embodiment, Obtain Job Reward Mod 304 of FIG. 3 first determines the expected reward that the first new job request will have and if it is accepted for performance on Cloud 115 of FIG. 1. Obtain Job Reward Mod 304 of FIG. 3 executes Obtain job characteristics SUB-MOD 310, Obtain job similarities to existing jobs in the cache SUB-MOD 312, and Determine job's reward based on the failures of existing jobs similar to the job SUB-MOD 314, in sequence, to determine the expected reward of the first new job request and compare the determined expected reward to a predefined reward threshold of Cloud 115 of FIG. 1. In this example, existing jobs that have the same characteristics as the job failed 9 times and succeeded 1 times, thus the reward is 0.1. The pre-defined reward threshold is 0.5, thus the job is rejected.

In alternative embodiments, the characteristics selected can be different. In further alternative embodiments, reward threshold value can be determined in a probabilistic way where every time the threshold is generated by a random number based on some random distribution. Job reward can be determined by analyzing historical data for previously accepted jobs by Cloud 115 and the success and failure of the previously accepted jobs of the historical data. In yet further alternative embodiments, the previously discussed analysis of historical data can be performed by machine learning modules.

Processing proceeds to operation S265 of FIG. 2, where Reject Job Mod 320 rejects the first new job request. In this example embodiment, the first new job request is rejected by Reject Job Mod 320 of Admission Controller 300 because Obtain job similarities to existing jobs in the cache SUB-MOD 312 of Obtain Job reward Mod 304 found that among existing jobs similar to the job there were more failed in the Cloud 115 of FIG. 1. Processing proceeds to operation S256, S258, S260 and S265 correspondingly. In some alternative embodiments, a notification may be sent to a client computer, such as client computers 104, 106 and 108, when a job is rejected. This will be discussed further below in relation to S280 of FIG. 2.

Processing proceeds to operation S270, where Receive Requests Mod 302 receives a second new job request. In this example embodiment, Client 104 of FIG. 1 sent a second new job request to Cloud 115, with the second new job request being a request to add an additional record to a second client database.

Processing proceeds to operation S272, S274, S275 and S280 of FIG. 2, where Obtain Job Reward Mod 304 determined that the second new job request had a reward of 0.9 based on its similarity to existing jobs and was accepted for processing by Cloud 115 of FIG. 1. The existing jobs in the cache in SUB-MOD 312 were obtained via network communication to CACHE 232 in FIG. 1. As discussed above, in this simplified example embodiment, following characteristics are selected: (i) the number of file handlers; (ii) stack size limit; and (iii) a process the number of process identifiers; (iv) the client ID; (v) the job type. In this example embodiment, Obtain Job Reward MOD 304 of FIG. 3 first determines the expected reward that the second new job request would have and if it was accepted for performance on Cloud 115 of FIG. 1. Obtain Job reward Mod 304 of FIG. 3 executes Obtain Job characteristics Sub-Mod 310, Obtain job similarities to existing jobs in the cache Sub-Mod 312, and Determine jobs' reward based on failures of existing jobs it is similar to SUB-MOD 314, in sequence, to determine the expected required value of each type of resource for the second new job request and compare the determined expected reward to the predefined reward threshold of Cloud 115 of FIG. 1. In this example, similar jobs that had the same characteristics to the second job succeeded 9 times and failed once. The reward of the second job was determined as 0.9 so the second new job request was accepted for performance on Cloud 115.

Figure 4:
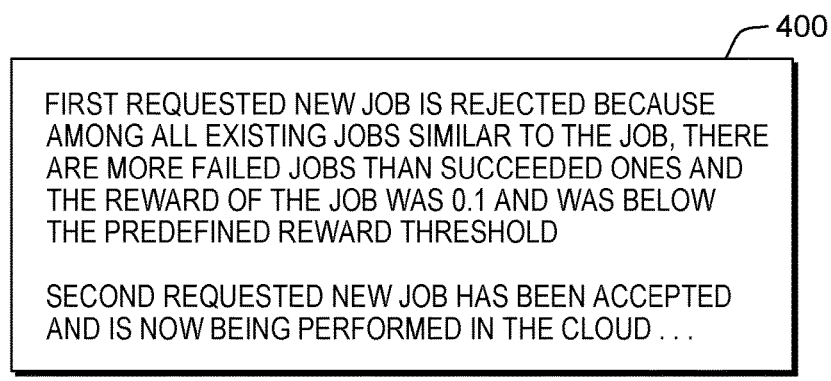
FIG. 4 is a screenshot view generated by the first embodiment system.

Processing proceeds to operation S280, where Accept Job Mod 322 accepts the second new job request for processing on Cloud 115 of FIG. 1. In this example embodiment, because Obtain job reward MOD 304 of FIG. 3 returned that among existing jobs similar to the job there were more succeeded jobs failed ones, thus the second new job request was accepted for performance on Cloud 115. In some alternative embodiments, as mentioned above at S265 of FIG. 2, when a job is accepted or declined by Admission Controller 300, a notification may be sent to the client requesting the job. As an example, if a notification were sent in this simplified embodiment, one example notification could resemble screenshot 400 of FIG. 4. In this screenshot, a notification message is shown indicating that the first new job request was declined, and the second new job was accepted and is being performed in the Cloud.

Processing proceeds to operation S285, where the second new job request, having been accepted by Accept Job Mod 322 of Admission Controller 300 show in FIG. 3, leads to the second new job being performed by Cloud 115 of FIG. 1.

III. Further Comments and/or Embodiments

Some embodiments of the present invention recognize the following facts, potential problems and/or potential areas for improvement with respect to the current state of the art: (i) in cloud environments, compute, network and storage resources are typically offered as commodities on demand; (ii) the cloud tenants request those resources through the cloud management system (CMS), which monitors the availability of the resources and provisions resources to the tenants; (iii) typically, agents running on cloud servers are used to monitor available resources and to inform the CMS; (iv) the CMS keeps track of the available resources (e.g., CPU, Memory, disk, network bandwidth) and admits requests when the desired resources are available; (v) nevertheless, certain type of resources may be unaccounted for by the CMS, or not monitored by the agents; (vi) one example would be in the Linux containers' Cloud; (vii) containers on the same worker share the same operating system kernel, thus the resource limitations in the kernel are inherited in the containers; (viii) for example, in a container cloud management system such as Kubernetes (or Docker Swarm), the tenant specifies the required resources for a container in terms of CPU and memory; (ix) however, there are other resources, such as stack limit, process identifiers, and file handlers, consumed by the container, but neither specified nor monitored by a typical container CMS; (x) these "other" resources are sometimes herein referred to as "hidden resources" because the CMS does not monitor them; (xi) when the cloud tenant requests a container whose operation will cause any of the hidden resource limits, then: (a) the container CMS will successfully schedule the container to a server, but (b) the container will repeatedly fail to start; (xii) containers whose operation will exceed hidden resource limits are typically accepted assigned to servers; (xiii) these containers can drain the hidden resources on assigned servers or cause the assigned servers to become unresponsive; (xiv) the CMS will then assume that these servers are down and restart these hidden-resource-intensive containers to other servers, which can cause a cascading failure that can eventually take a whole cluster down; (xv) existing published papers and inventions focus on the basic functions of the admission control, which is to admit requests based on known resource availability; and/or (xix) none of the existing research works and main stream CMS systems (for example, OpenStack, Kubernetes, Mesos, Docker Swarm) address the issue of hidden resources.

Some embodiments of the present invention may include one, or more, of the following features, characteristics and/or advantages: (i) a solution that: (a) learns from the successful operational state of past resource, (b) requests a reward on condition that it agrees to accept the current resource request, and (c) based on the value of this reward, takes an accept or reject decision; (ii) enforcing a back off mechanism that prevents failures from recurring and from propagation caused by known and hidden resource limits; and/or (iii) using data-driven models to derive rewards for incoming requests based on successful operational states of similar past requests and uses the value of such rewards to guide the admission control.

One embodiment of the invention includes four (4) modules as follows: (i) a reward collection module, (ii) a request clustering module, (iii) a request classification module, and (iv) an admission control module. The reward collection module collects rewards for all accepted requests. The request clustering module clusters all possible requests into multiple categories. The request classification module classifies every incoming request into a category, which belongs to all categories obtained in the request clustering module. The admission control module admits or rejects the incoming request in two operations as follows: (i) obtain an expected reward of the incoming request by applying a valuation function over rewards of accepted requests in the same category; and (ii) accept or reject the request based on its expected reward. Compared to existing works on admission control, this reward based admission controller can prevent resource request failures and even cascading failures caused by hidden resource limits and inappropriate resource requests. "Inappropriate requests" are hereby defined as ones that will fail even after being admitted. As mentioned above, in some cases these failures could trigger cascading failures that may bring down the whole Cloud. This embodiment derives expected rewards from the operation status of previously accepted requests and uses the value of such expected rewards to at least partially control whether a new request is admitted or rejected.

Some embodiments of the present invention may include one, or more, of the following features, characteristics and/or advantages: (i) a reward-based admission controller for an open-source container cloud management platform, Kubernetes; (ii) Kubernetes is used to automate the deployment, scaling, and management of containerized applications; (iii) API requests in Kubernetes include Create, Read, Update, Delete (CRUD) operations for various types of objects; (iv) the objects in Kubernetes compose and represent together the state of the cluster and the containerized workloads; (v) the smallest compute resource unit in Kubernetes is a "pod", representing a group of one or more containers, atomically managed and placed on the same server; (vi) users' containers are created through "pods"; (vii) implementing the admission controller for Create and Update (CU) API requests for "pods" as these requests consume resources in the Kubernetes cluster; (viii) the reward-based admission controller is composed of four modules: (a) reward collection, (b) request clustering, (c) request classification, and (d) admission control; (ix) an implementation of a reward collection module includes pod creation and update requests that can consume resources which are not monitored in Kubernetes, such as memory stack and process IDs; (x) cloud resource requests can fail due to these hidden resource limits; (xi) assigning rewards to the accepted requests can reflect whether the requests are successfully executed in the cluster; (xii) the action to accept an incoming request can be evaluated by the rewards of the past accepted requests; (xiii) an implementation of the reward is to assign 1 to the successful execution of CU pod requests and assign 0 to failed CU pod requests; (xiv) 1 represents that accepting the request leads to 100% success of request execution; (xv) 0 represents that accepting the request ends up with 0% success of request execution; (xvi) the objective of the reward is to represent how the action impacts the system; (xvii) reward value can vary; and/or (xviii) some implementations of reward should provide a feedback on actions of accepting or rejecting the requests.

Some embodiments of the present invention may include one, or more, of the following features, characteristics and/or advantages: (i) an implementation of the clustering of requests module includes a clustering module to cluster all accepted requests into several categories; (ii) assume that the requests clustered in the same category fail in a similar way and have a similar overall probability to fail in the future; (iii) the rewards of accepted requests of a certain type can be used to value the expected reward for an incoming request in the same category; (iv) cluster pod requests based on pod features related to possible request failures; (v) example features include but are not limited to: (a) the container images in the pod, and (b) the desired resource of the pod, etc.; (vi) given selected features, various clustering algorithms can be applied; (vii) a simple embodiment is K-Means algorithm; (viii) an embodiment of the request clustering algorithm should group requests via features that can lead to similar rewards; (ix) the rewards of accepted requests can be used to value the expected rewards of incoming requests in the same category; (x) an implementation of request classification module includes, given various categories of requests obtained, the function of classifying each incoming request to an existing category to evaluate its expected rewards; (xi) the features used to cluster requests are also used to classify the request; (xii) various classification methods can be used; and/or (xiii) a simple embodiment of the classification module consists in keeping a look-up table that maps the pod features to the cluster type computed.

Some embodiments of the present invention may include one, or more, of the following features, characteristics and/or advantages: (i) an implementation of an admission controller includes a reward-based admission controller that can reject requests in advance to prevent the potential request execution failures that may cause other failures or even cascading failures in the Cloud; (ii) the admission controller mainly accepts or rejects the requests based on an evaluation of expected rewards; (iii) the expected reward is evaluated based on rewards of accepted requests in the same category, referred to as a valuation process; (iv) the valuation process can have different embodiments, such as an averaging of rewards over all accepted requests in the same category; (v) given an expected reward evaluated for the coming request, the admission controller determines the admission of the request; (vi) how the admission controller accepts or rejects the request can have various embodiments; (vii) one embodiment is to accept the request with a probability that is related to the expected reward; (viii) for requests with larger expected rewards, the admission controller has higher probability to accept the request; (ix) another embodiment can be a threshold based admission controller; (x) the controller rejects the request if its expected reward is lower than a predefined threshold; (xi) the admission controller can also apply various other embodiments.

Some embodiments of the present invention may include one, or more, of the following features, characteristics and/or advantages: (i) a reward based admission controller is a technological improvement that improves the resilience of cloud management systems by greatly reducing potential workload failures in the Cloud; (ii) preventing potential cascading failures caused by workload; (iii) overall it will improve the availability and stability of Cloud service offered and the reliability of the Cloud system itself; (iv) this is a specific improvement in computer capabilities because many embodiments of the present reward based admission controller enhance container orchestration platforms for container Clouds, which is specific to computer systems and cannot be implemented without computers; (v) using data-driven models to derive rewards for incoming requests based on successful operational states of similar past requests; (vi) using the value of such rewards to guide the admission control; (vii) admission control represents the validation process to check whether the cloud system will fail to serve the incoming request, due to known and unknown reasons; (viii) serving an incoming request implies executing pre-defined operations, which generally relate to resource provisioning and management; (ix) admission control is generally used in Cloud management systems to accept or reject API requests based on criteria such as: (a) resource availability, (b) system health, (c) desired quality of service (QoS), and (d) security concerns; (x) these requests include, but are not limited to: (a) requests to provision virtualized resources such as virtual machines, (b) virtual storage, (c) virtual networks, (d) requests of starting applications, (e) containers, (f) services, and (g) etc.; (xi) however, these general admission controllers cannot prevent admitting requests that would fail due to some unknown reasons; (xii) some embodiments of the invention include 4 modules: (a) a reward collection module, (b) a request clustering module, (c) a request classification module, and (d) an admission control module; (xiii) A reward collection module collects rewards for all accepted requests; (xiv) a request clustering module clusters all possible requests into multiple categories; (xv) a request classification module classifies every incoming request into a category, which belongs to all categories obtained in module b; and/or (xvi) an admission control module admits or rejects the incoming request in two steps: first, it obtains an expected reward of the incoming request by applying a valuation function over rewards of accepted requests in the same category, and second, it accepts or rejects the request based on its expected reward.

Some embodiments of the present invention may include one, or more, of the following features, characteristics and/or advantages: (i) one objective is to improve the resiliency of the system by avoiding repeated failures caused by similar requests; (ii) some of the targeted resources cannot be explicitly predicted by the information on each request; (iii) there are more types of resources consumed in Cloud systems than what are monitored and a lot of those that are consumed by requests cannot be explicitly predicted; (iv) the reward is learned from past execution history, considering the performance of similar requests; (v) the history of request rewards is used to improve the prediction of coming requests; (vi) an admission control that is more robust, as it adapts as the prediction of request reward evolves; (vii) one proposed method can 'adapt' to inaccurate information and non-stationary changes in system behavior; (viii) handling cases where the utility function does not possess an explicit form; (ix) behaviors of requests in Cloud systems cannot be explicitly expressed from the information of the requests; (x) solve request failures that are caused by "hidden" resources, unknown to admission controllers; and/or (xi) an admission controller that optimizes the overall rewards of requests over time, where rewards can be learned through experience but cannot be modeled as function of measurable resources.

Some embodiments of the present invention may include one, or more, of the following features, characteristics and/or advantages: (i) an admission controller; (ii) handling requests whose performance are impacted by non-identifiable bottleneck or bugs, where the system cannot be modeled as a queue; (iii) an admission controller in some embodiments needs to implement a valuation module to estimate an expected reward of admitting an incoming request based on rewards collected from requests admitted in the past; (iv) determine the admission requests, whose performance/runtime states can be impacted by non-identifiable bottleneck resources and cannot be modeled; (v) an admission controller to optimize the run-time performance of admitted requests so the cloud system only admits application requests that run with a healthy state/good performance; (vi) failures or performance issues of requests can either occur due to the resources not measurable or due to other issues, e.g. buggy code; (vii) update or adapt according to new accepted requests; (viii) update the admission controller based on the run-time states of admitted requests over time; (ix) some embodiments require implementing a monitoring agent to collect run time states/performance over time; (x) some embodiments require allowing communications between the monitoring agent and the admission controller to update the valuation module in the admission controller; (xi) a valuation module in the admission controller should estimate the expected rewards based on rewards of all requests admitted; and/or (xii) especially taking those more recent admitted requests into consideration.

Some embodiments of the present invention may include one, or more, of the following features, characteristics and/or advantages: (i) an admission controller including a monitoring agent exporting data; (ii) a monitoring agent exports the run time states of admitted applications to the admission controller, which are performance level data; (iii) export data for an explicit objective, to be used in the admission controller; (iv) the monitoring agent is implemented to export data about application/service runtime states/performance; (v) also implement admission controller that communicates with the monitoring agent to make admission control decisions; (vi) address the question on how history data of consumption of resources or usages of software for applications running in the cloud can improve the system management; (vii) address a completely different problem of whether admit or reject an application request in the Cloud system; (viii) export recent history data to the admission controller, but not data about consumption of resources or usage etc.; (ix) export the run time states of application, which are performance level data; and/or (x) export history data to the admission controller for an explicit objective: improving the overall cluster resilience or application performance via rejecting those requests that may have performance issues or failures.

Some embodiments of the present invention may include one, or more, of the following features, characteristics and/or advantages: (i) addressing wider applications beyond cloud database, such as long-run services that do not have deadlines; (ii) predicting the rewards of the admission of a service/application, which represents run-time states of the admitted services; (iii) it can include many factors in addition to the deadlines; (iv) predicting the rewards of the queries based on their similarity to admitted queries instead of collected features; (v) similarity can be evaluated based on features or not; (vi) handle the case where there are "hidden" system states, namely non-measurable states, impacting the rewards of the request; (vii) reward prediction is not based on measurable system states; (viii) some embodiments require implementing a request clustering module to get the types of possible requests; (ix) some embodiments require implementing a request classification module to classify the incoming requests to existing categories; (x) addressing an admission controller which determines whether the system should admit or reject an application request; (xi) learn from the history to determine whether the future application request will fail or have performance issues due to "hidden" resources that cannot be observed or measured, neither absolutely nor relatively; (xii) some embodiments require implementing the request classification module to classify the incoming request to a known category; and/or (xiii) some embodiments require implementing a valuation module in a monitoring agent to estimate the expected rewards of an incoming request.

Some embodiments of the present invention may include one, or more, of the following features, characteristics and/or advantages: (i) in cloud environments, compute, network and storage resources are offered as commodities on demand; (ii) cloud tenants request those resources through a cloud management system (CMS), which monitors the availability of the resources and provisions resources to the tenants; (iii) usually agents running on cloud servers are used to monitor available resources and to inform the CMS; (iv) CMS keeps track of the available resources (e.g., CPU, Memory, disk, network bandwidth) and admits requests when desired resource is available; (v) admission control is widely used in cloud management systems to accept or reject resource requests based on criteria like resource availability, system health, desired quality of service (QoS), security concerns; (vi) typically the admission control represents the validation process to check whether the cloud system has sufficient current resources, known and unknown, to serve an incoming request; (vii) These requests include, but are not limited to, (a) requests to provision virtualized resources such as virtual machines, virtual storage, virtual networks, etc., and (b) requests of starting applications, containers, services, etc.; (viii) in container cloud, these requests are container requests; (ix) each container request can run different container images and the operational states of containers are related to their images as well; (x) certain type of resources may be unaccounted for by the CMS, or not monitored by the agents; (xi) an example would be in the Linux containers cloud; (xii) containers on the same worker share the same operating system kernel, thus the resource limitations in the kernel are inherited in the containers; and (xiii) for example, in a container cloud management system like Kubernetes or Docker Swarm, the tenant specifies the required resources for a container in terms of CPU and memory.

Some embodiments of the present invention may include one, or more, of the following features, characteristics and/or advantages: (i) however, there are other resource limit, such as stack size, the limit of process identifiers, and the limit of file handlers, etc.; (ii) these resources are consumed by the container, but are neither specified and nor monitored by the Kubernetes; (iii) we refer to those resources as "hidden" resources since the CMS is not aware of them; (iv) when the cloud tenant requests a container that exceeds those hidden resource limits, the CMS will successfully schedule the container to a worker, however the container will repeatedly fail to start; (v) similar containers that exceed hidden resource limits will be accepted and assigned to other workers; (vi) these containers can drain the hidden resources on workers until workers are unresponsive; (vii) the CMS then assumes that these servers are down and restart these containers on other workers; (viii) this will trigger a cascading failure that eventually tears down the whole cluster; (ix) certain type of workload may always fail; (x) various issues in container images can lead to such failures; (xi) the container image may contain buggy code that crashes the containers, or the code it runs requests some volumes that are not properly mounted, or the entry command is not proper configured, etc.; (xii) then Kubernetes will regard the container as crashed ones and will try to reschedule/restart it again and again; (xiii) this will overload the scheduler and will waste cluster resources on workload that will never run properly; (xiv) aim at solving the problem of workload failures caused by various issues, including both known/unknown resource limit related issues and container image issues; (xv) propose an admission controller that admits resource requests based on rewards, which are learned from the operational states of admitted resource requests in the past; (xvi) rewards favor requests similar to existing requests that have been operating well and disfavor requests similar to existing requests with recent operational failures; (xvii) one solution enforces a back off mechanism that prevents failures from recurring and propagation caused by known and hidden resource limits; and/or (xviii) none of the existing research works and main stream CMS systems (e.g. OpenStack, Kubernetes, Mesos, Swarm) address the issue of hidden resources.

Some embodiments of the present invention may include one, or more, of the following features, characteristics and/or advantages: (i) compared to existing works on admission control, some embodiments of the reward based admission controller can prevent resource request failures and even cascading failures caused by hidden resource limits and inappropriate resource requests; (ii) define inappropriate requests as ones that will fail even after being admitted and the failures could trigger cascading failures that may bring down the whole cloud; (iii) none of the known solutions, derive rewards from the operation status of accepted requests and use the value of such rewards to influence the admission process; (iv) implement a reward based admission controller for an open-source container orchestration platform, Kubernetes; (v) Kubernetes is used to automate the deployment, scaling, and management of containerized applications; (vi) API requests in Kubernetes include Create, Read, Update, Delete (CRUD) operations for various types of objects; (vii) the major objects in Kubernetes are Workloads, which are responsible for managing and running users containers on the cluster; (viii) users containers are created through pods; (ix) implement the admission controller for Create and Update (CU) API requests for pods as these requests consume resources in the Kubernetes cluster; (x) a resilient admission control system that uses data-driven approach to guide the admission control; (xi) it monitors the operational states of admitted requests in the past to model the rewards of container requests; (xii) it predicts the operational states of incoming container requests based on rewards of similar requests; (xiii) it then determines whether to admit or reject an incoming container request based on the predicated reward; (xiv) one implementation of the admission controller includes 4 modules in a container cloud: (a) a reward collection module, (b) a request clustering module, (c) a request classification module, and (d) an admission control module; (xv) a reward collection module collects rewards for all accepted container requests; (xvi) a request clustering module clusters all possible requests into multiple categories; (xvii) a request classification module classifies every incoming request into a category, which belongs to all categories obtained in the request clustering module; (xviii) an admission control module admits or rejects the incoming request in two steps; (xix) first, it obtains an expected reward of the incoming request by applying a valuation function over rewards of accepted requests in the same category; (xx) second, it accepts or rejects the request based on its expected reward; (xxi) when a container request comes to the orchestration platform, it is firstly classified by the request classification module; (xxii) then the admission controller reads its expected reward according to its request type from a distributed key store (such as ETCD) database; and (xxiii) the database is denoted as valuation ETCD, where the reward collection agent updates the rewards of all types of admitted container requests based on their operation status.

Some embodiments of the present invention may include one, or more, of the following features, characteristics and/or advantages: (i) other algorithms can be applied in these modules if necessary; (ii) implement request clustering as an off-line clustering module based on workload logs collected in the past; (iii) implement the request classification module and admission controller as a web-hooked admission controller in Kubernetes; (iv) start an ETCD database to cache the rewards for all types of requests and deploy reward collection agent as a container with administration access in the cluster; (v) implementation of the reward collection agent includes pod creation and update requests can consume resources such as memory stack and process IDs, which are not monitored in Kubernetes; (vi) the requests can fail due to these hidden resource limits; (vii) assigning rewards to the accepted requests can reflect whether the requests are successfully executed in the cluster; (viii) thus, the action to accept the request can be evaluated by the rewards of the requests; (vix) an implementation of the reward can assign a value of 1 to the successful execution of CU requests for pods and assign a value of 0 to the failed CU requests for pods; (x) a value of 1 represents that accepting the request leads to 100% success of request execution; (xi) a value of 0 represents that accepting the request ends up with 0% success of request execution; (xii) one objective of the reward is to represent how the action taken impacts the system; (xiii) its reward value can vary; and/or (xiv) the reward should reflect the result or the feedback of actions of accepting or rejecting the requests.

Some embodiments of the present invention may include one, or more, of the following features, characteristics and/or advantages: (i) implementation of the request clustering includes a clustering module clusters all admitted container requests into several categories; (ii) the system makes assumption that the container requests can be clustered in a way that containers grouped in the same category will fail in similar ways and have similar probabilities to fail; (iii) thus, the rewards of accepted requests in one category can be used to value the expected reward for an incoming request classified in the same category; (iv) the pod requests can be clustered based on features related to failures; (v) example features include but are not limited to the container images in the pod, the desired resource of the pod, etc.; (vi) given features selected, various clustering algorithms can be applied; (vii) one example algorithm is a simple algorithm, such as DBScan algorithm; (viii) one goal of the request clustering algorithm is to group requests via features that will cause operation failures; (ix) thus, the rewards of admitted requests can be used to predict the rewards of similar incoming requests; (x) implementation of the request classification includes: given various categories of requests obtained in the clustering algorithm, implementing the classification module by computing the distance of the features of each incoming request to the features of different types of container requests obtained in the clustering; (xi) classify the incoming request to the category, where the center of features of container requests in this category has the smallest distance to the feature of the incoming container request; (xii) the distance of the feature can be specified by various criteria related to the container request in Kubernetes; (xiii) for example, the distance can represent if the requested memory and CPU capacity for containers with the same image are the same; and/or (xiv) if they are different, the distance should represent such difference.

Some embodiments of the present invention may include one, or more, of the following features, characteristics and/or advantages: (i) implementation of the admission control includes an admission controller that rejects container requests in advance to prevent the potential request execution failures, which can also protect the cluster from cascading failures caused by the workload; (ii) the admission controller mainly accepts or reject the requests based on a valuation of expected rewards; (iii) as discussed above, the reward of a certain type of containers' requests can be evaluated based on rewards of admitted container requests in the same category; (iv) such an evaluation is the same as the valuation process in action-value methods, which is a valuation of an action based on results of the action; (v) here, the action is to admit or reject a resource request; (vi) the valuation process can also adopt different techniques, such as an averaging of rewards over all admitted requests in the same category or an exponential weighted averaging of rewards on each admitted request; (vii) the valuation of one type of requests can be used as a prediction of reward for future requests in the same type; (viii) given a reward predicted for an incoming request, the admission controller should determine whether to admit or reject the request; (ix) as the valuation is based on rewards, which are derived from execution status of the past requests, the lower the predicted reward is, the more likely the containers to run will fail; (x) a simple implementation of the admission controller can admit the request with a probability that is related to the predicted reward; (xi) for request with larger predicted reward, the admission controller has higher probability to admit the request; (xii) an alternative implementation can be a threshold based admission controller, where the controller rejects the request if its predicted reward is lower than a pre-defined threshold $r_{min}$; (xiii) various different algorithms can also be applied if necessary; (xiv) the principle is to consider the predicted reward of the coming request in the admission controller; and/or (xv) in this way, the system learns as more failures are observed and prevent similar failures to recur.

Figure 5:
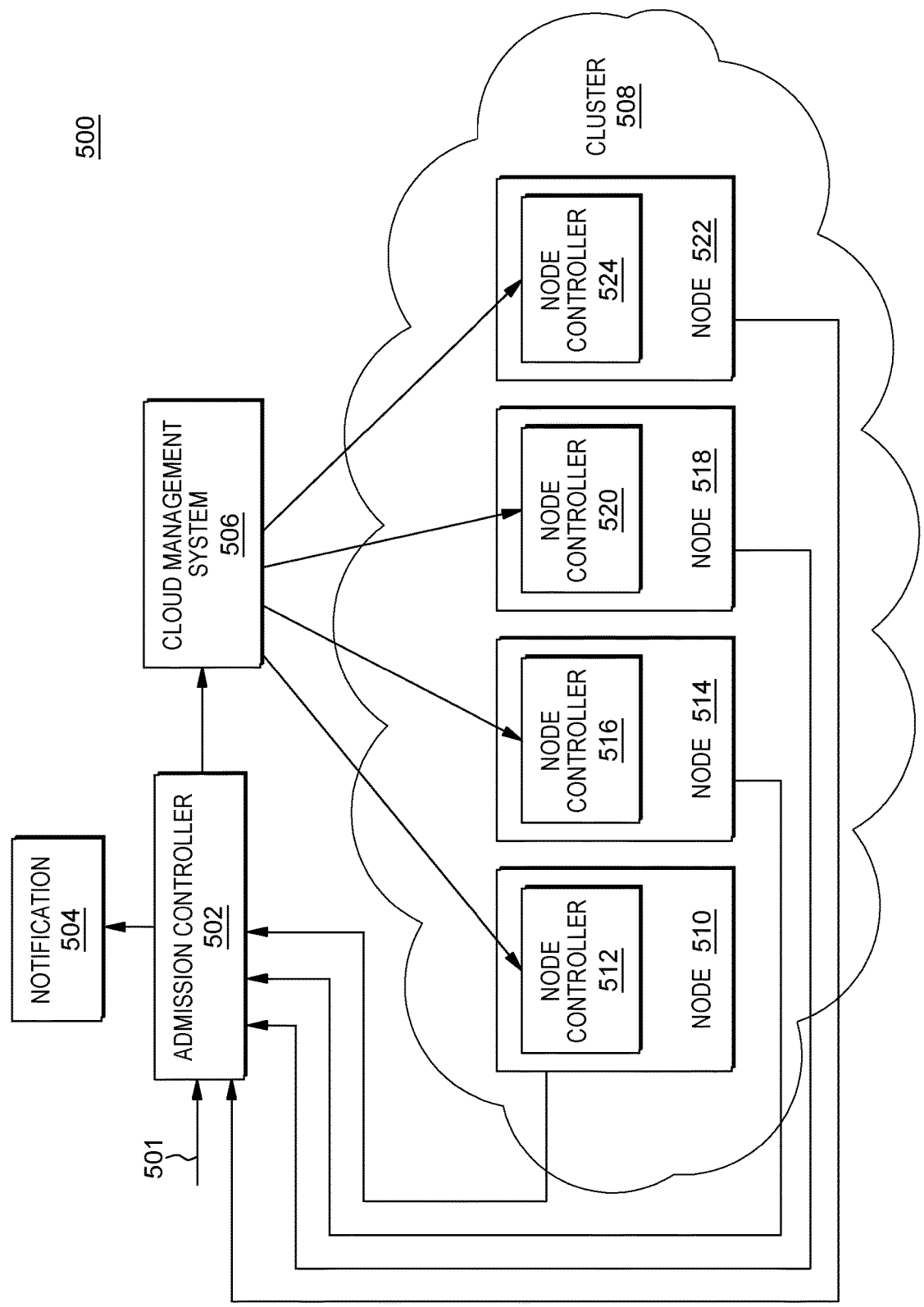
FIG. 5 is a block diagram of a second embodiment of a system according to the present invention.

An example embodiment will now be discussed in relation to FIG. 5, which shows at a high-level Reliant Admission Control System 500. Reliant Admission Control System 500 includes incoming request 501, which is initially received by Admission Controller 502. If Admission Controller 502 rejects incoming request 501, then Notification 504 is transmitted to the entity that sent incoming request 501 to Admission Controller 502.

After Admission Controller 502 receives incoming request 501, Cloud Management System 506 is invoked to instruct Cluster 508 to provide the required resources to Admission Controller 502 so that Admission Controller 502 may award the required resources to fulfill incoming request 501. To achieve this, Cluster 508 instructs the respective Node Controllers (512, 516, 520 and 524, respectively) of the Nodes (Node 510, 518 and 522) to provide the required resources to Admission Controller 502. Admission Controller 502 awards the required resources to incoming request 501.

Another example embodiment will now be discussed in relation to FIG. 6, which shows a Kubernetes Implementation of a Reliant Admission Control System 600. Reliant Admission Control System 600 includes Kubernetes Cluster 602, which receives incoming request 604 and is classified according to request classification. Incoming request 604, which for example may be a request for a CRUD operation is received by API Server 606 that handles CRUD operations. API Server 606 has a data communication connection with Admission Controller 608, enabling API Server 606 to pass incoming request 604 to Admission Controller 608 for identification of whether the request should be admitted (and rewarded with resources from Kubernetes Cluster 602) or denied. To evaluate requests, Admission Controller 608 identifies the expected reward for incoming request 604, should the request be admitted, by tasking Scheduler 610 with identifying one or more worker(s) of Kubernetes Cluster 602 (612, 618, 626 and 632) that possess(es) previously admitted requests (also known as pods) similar to incoming request 604. Workers 612, 618, 626 and 632 have their respective Kubelets (614, 620, 628 and 634) determine if they possess previously admitted requests similar to incoming request 604.

Figure 6:
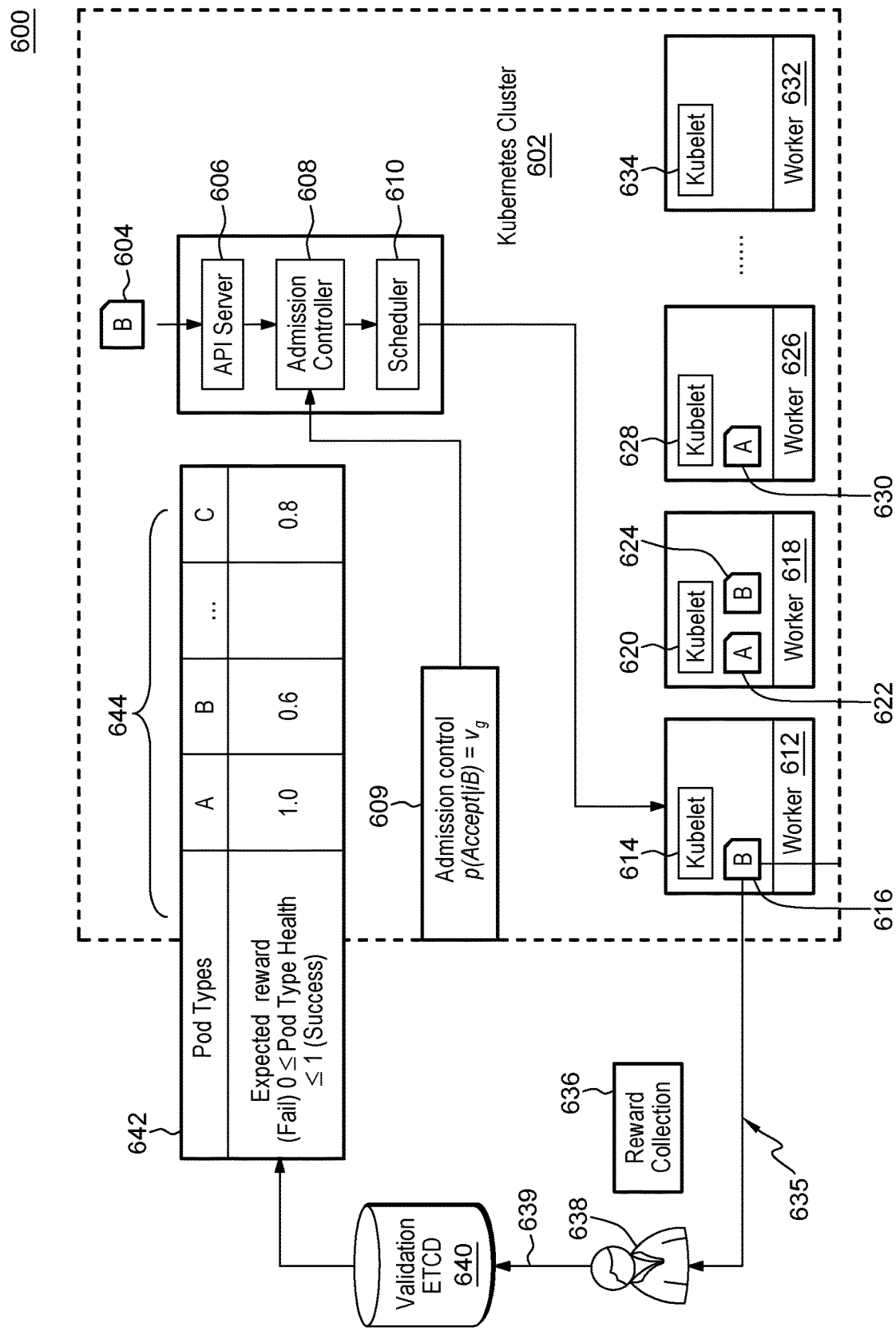
FIG. 6 is a block diagram of a third embodiment of a system according to the present invention.

In the example shown in FIG. 6, Worker 612 possesses previously admitted request 616 of a type "B", Worker 618 possesses previously admitted request 622 of a type "A" and previously admitted request 624 of type "B", Worker 626 possesses previously admitted request 630 of type A, and Worker 632 possesses no previously admitted request. In this example embodiment, Kubelet 614 of Worker 612 communicates operational information about previously admitted request 616 for reward collection via reward computation 635 by reward collection agent 638 conducts reward collection 636. Reward collection agent 638 consults Valuation ETCD 640 for information about rewards for all previously admitted requests and instructs ETCD 640 via 639 to update reward collection—reward update based on the operational status of all previously admitted rewards. Valuation ETCD 640 clusters admitted container requests into several categories based on similarities in previous failures, shown at 642, with the request clusters A, B, and C shown at 644 with probabilities of failure shown as '1.0', '0.6' and '0.8', respectively. Based upon the information in Valuation ETCD 640 and the classified incoming request 604, ETCD 640 communicates the predicted reward for incoming request 604 to Admission Controller 608, which then evaluates whether to accept or decline incoming request 604 according to algorithm 609.

Figure 7:
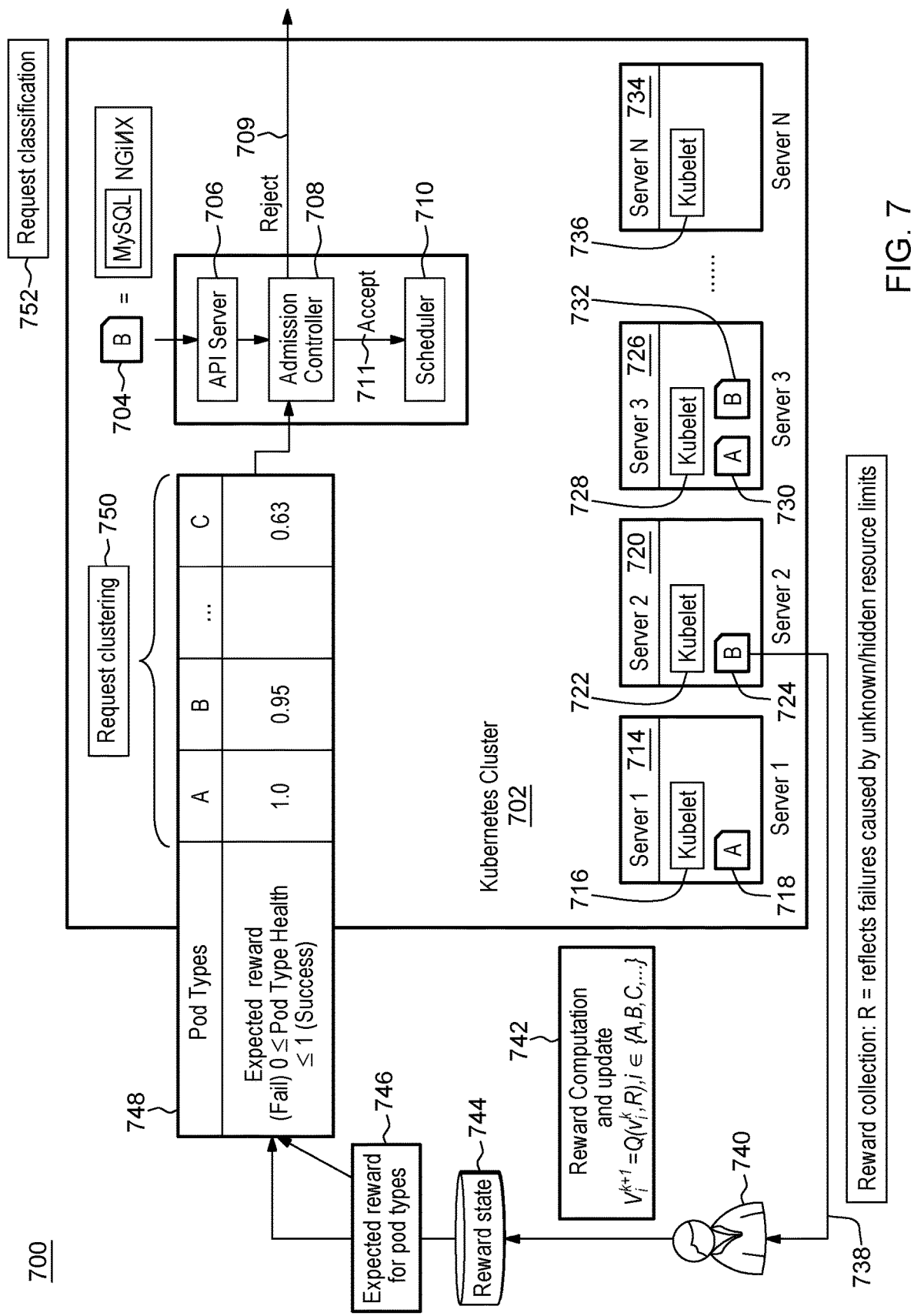
FIG. 7 is a block diagram of a third embodiment of a system according to the present invention.

Yet another example embodiment will now be discussed in relation to FIG. 7, which shows another Kubernetes Implementation of a Reliant Admission Control System 700. Reliant Admission Control System 700 runs in Kubernetes Cluster 702, which receives incoming request 704, which, for example, may be requests for MySQL or NGiHX, for request classification 752. Incoming request 704, which for example may be a request for a CRUD operation is received by API Server 706 that handles CRUD operations. API Server 706 has a data communication connection with Admission Control 708, enabling API Server 706 to pass incoming request 704 to Admission Control 708 for identification of whether the request should be admitted (and rewarded with resources from Kubernetes Cluster 702) or denied.

Kubernetes Cluster 702 also includes scheduler 710, Server 1 714, Server 2 720, Server 3 726, and Server N 734. Each Server (714, 720, 726, and 734) includes a Kubelet (716, 722, 728 and 736, respectively). Server 1 714 additionally includes previously admitted request (pod) 718 of type 'A'. Server 2 720 additionally includes pod 724 of type 'B'. Server 3 726 additionally includes pods 730 of type 'A' and 732 of type 'B'.

After Admission controller 708 receives incoming request 704, scheduler 710 and controller 712 are tasked with communicating information about request 704 to the servers (714, 720, 726 and 734) so that their respective Kubelets (716, 722, 728 and 736) can identify which (if any) pods are similar to incoming request 704. In this example, Kubelet 722 of Server 2 720 identifies pod 724 is similar to incoming request 704 and communicates pod 724 operational status information to reward collection agent 740, including calculating a reward R 738, where R reflects failures caused by unknown/hidden resource limits. Reward Collection Agent 740 queries reward state database 744 for information about expected rewards for pod types 746 shown in table 748, with request/pod clusters shown at 750. Additionally, Reward Collection Agent 740 computes the expected reward for incoming request 704, as well as updated expected rewards based on pod types, via algorithm 742, and updates the expected reward table of reward state database 744. Information about the expected reward for incoming request 704, including information indicative of a likelihood of success based on the classification of incoming request 704 and similar previously admitted requests assigned pods and resources, is communicated to admission control 708, which then either rejects the request, proceeding down path 709, or accepts the incoming request 704 and tasks scheduler 710 via path 711 to requisition a pod and resources in Kubernetes Cluster 702 to process incoming request 704.

Figure 8:
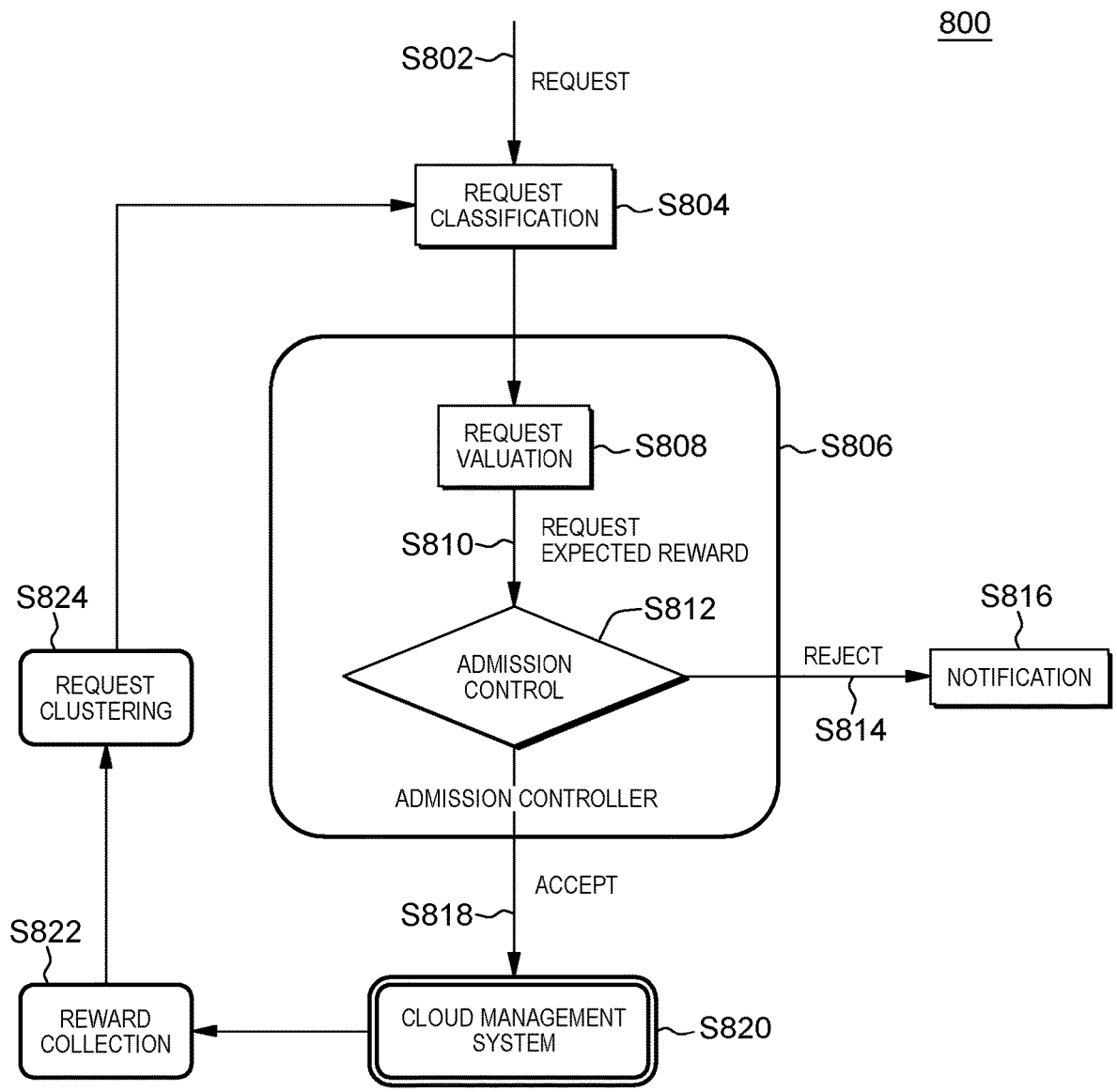
FIG. 8 is a flowchart of a fourth embodiment of a method according to the present invention.

FIG. 8 shows flowchart 800 which is an embodiment of a method according to the present invention that includes the following operations: S802, S804, S806, S808, S810, S812, S814, S816, S818, S820, S822 and S824. S824 is a clustering algorithm module running on historical data collected in a fixed time period. Process flow among and between these operations is shown in FIG. 8.

Figure 9:
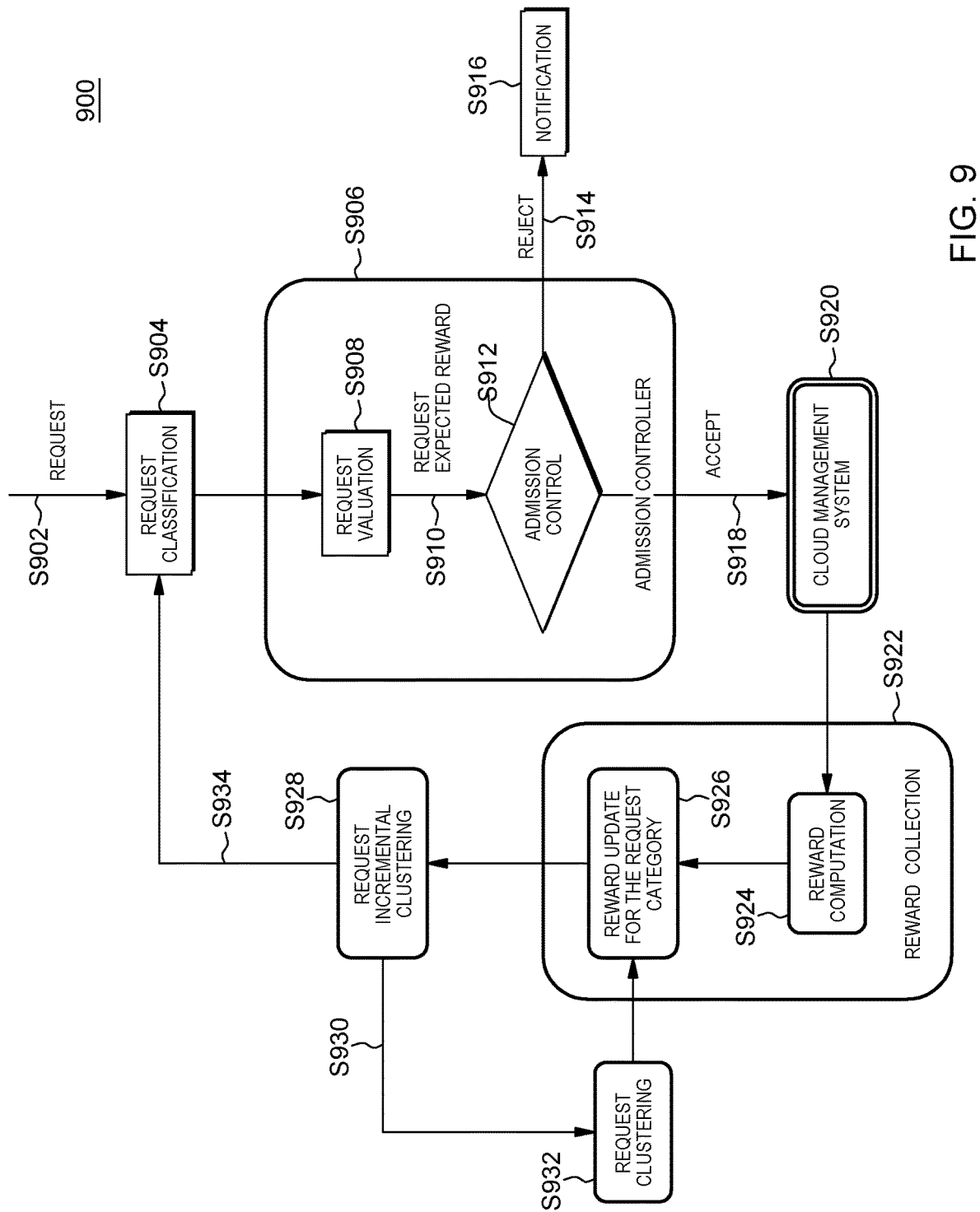
FIG. 9 is a flowchart of a fifth embodiment of a method according to the present invention.

FIG. 9 shows flowchart 900 which is an embodiment of a method according to the present invention that includes the following operations: S902, S904, S906, S908, S910, S912, S914, S916, S918, S920, S922, S924, S926, S928, S930, S932 and S934. S928 is the incremental clustering algorithm that updates the clusters based on new requests' reward updated in S926. S932 is clustering algorithm running on historical data collected in a fixed time period. Process flow among and between these operations is shown in FIG. 9.

Figure 10:
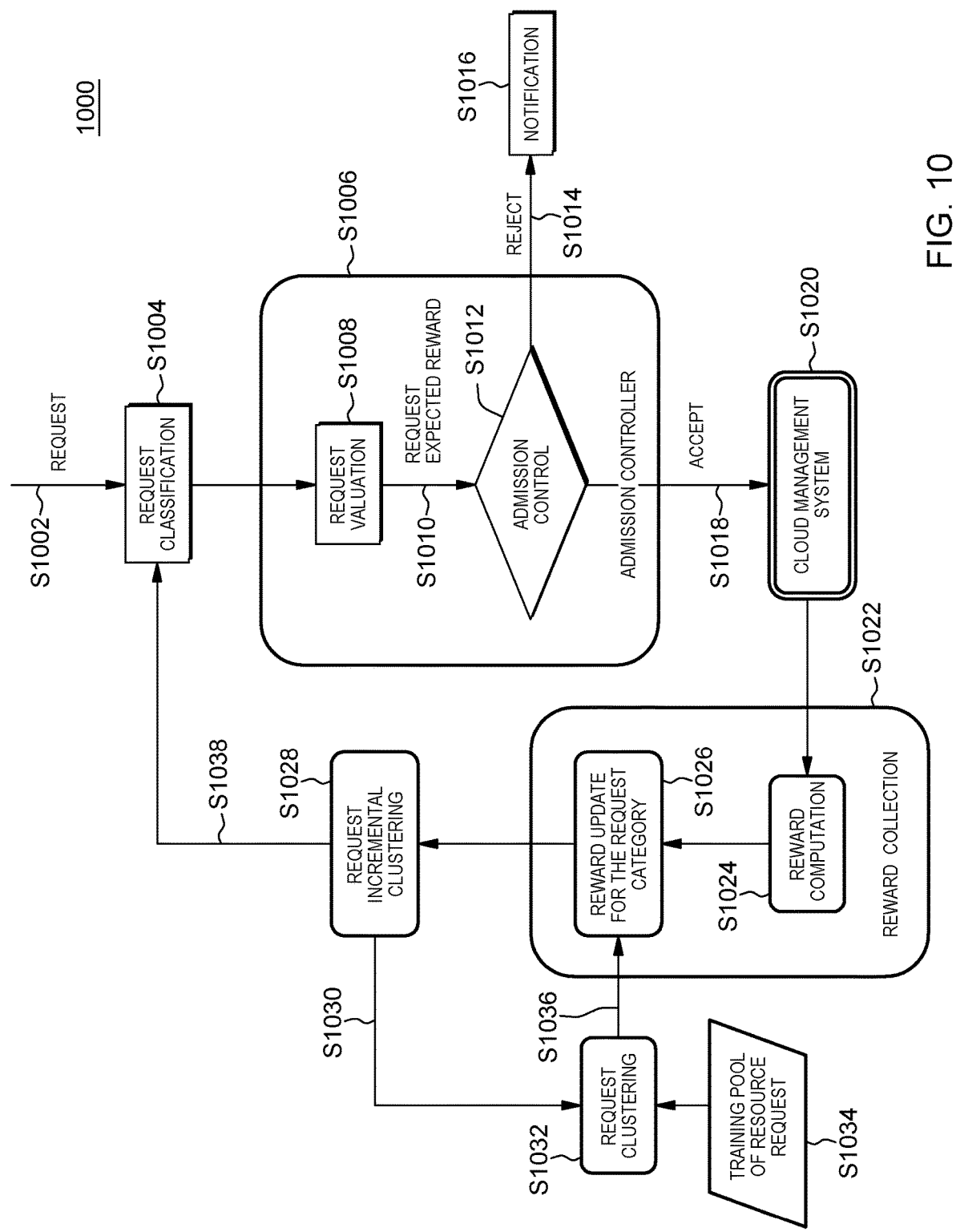
FIG. 10 is a flowchart of a sixth embodiment of a method according to the present invention.

FIG. 10 shows flowchart 1000 which is an embodiment of a method according to the present invention that includes the following operations: S1002, S1004, S1006, S1008, S1010, S1012, S1014, S1016, S1018, S1020, S1022, S1024, S1026, S1028, S1030, S1032, S1034, S1036 and S1038. S1028 is the incremental clustering algorithm that updates the clusters based on new requests' reward updated in S1026. S1034 is a collection of data in a rolling window that only keeps data in recent history. Process flow among and between these operations is shown in FIG. 10.

Figure 11:
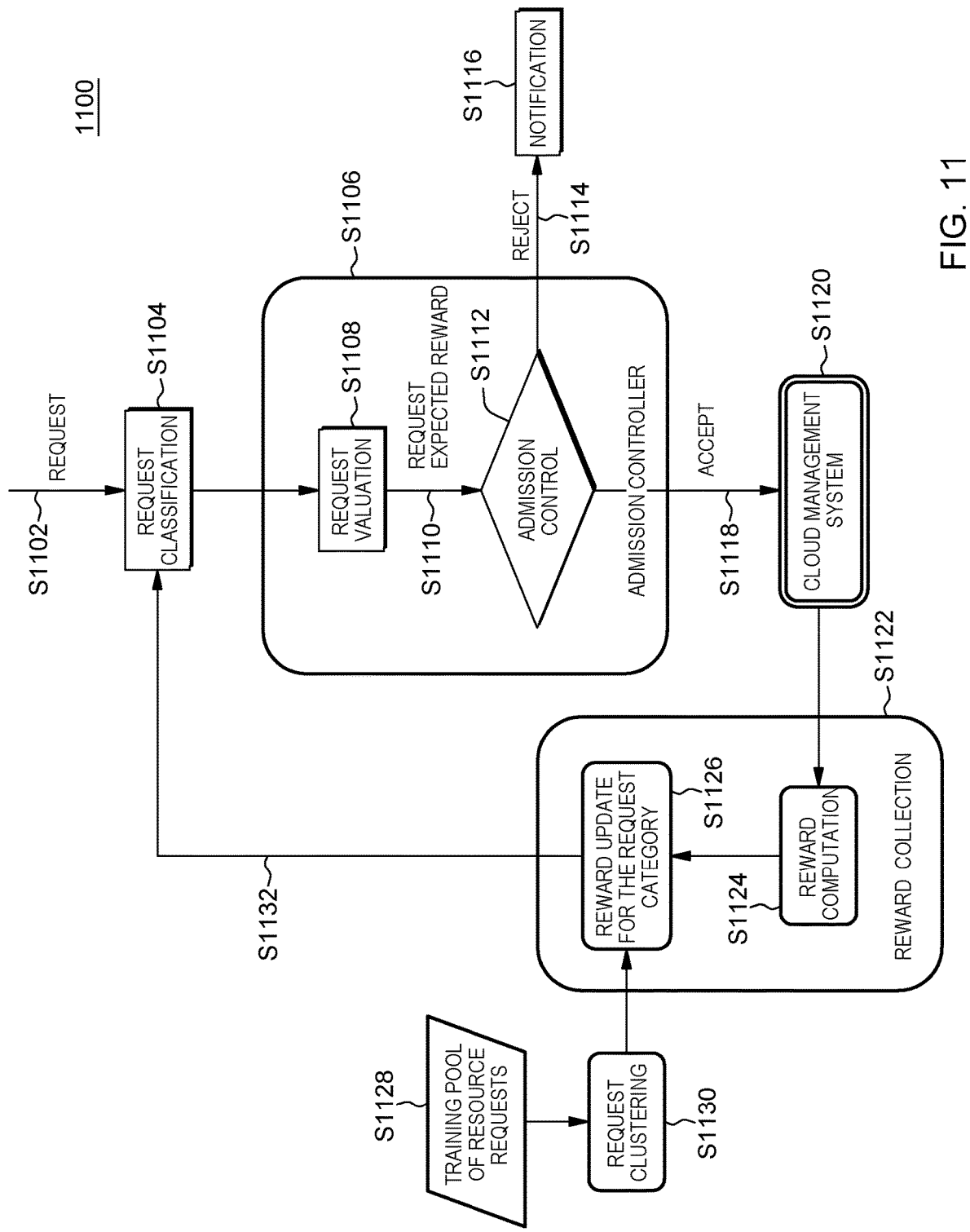
FIG. 11 is a flowchart of a seventh embodiment of a method according to the present invention.

FIG. 11 shows flowchart 1100 which is an embodiment of a method according to the present invention that includes the following operations: S1102, S1104, S1106, S1108, S1110, S1112, S1114, S1116, S1118, S1120, S1122, S1124, S1126, S1128, S1130 and S1132. S1122 only updates rewards for different categories of requests and does not update the categories obtained by S1130. The Process flow among and between these operations is shown in FIG. 11.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
receiving a first new job request data set including information indicative of a first new job being requested to be performed by a cloud managed by a cloud management system;
determining, by an admission controller of the cloud management system, that performance of the first new job by the cloud would cause failures that are not reflected in monitored parameters but are indicated by job characteristics; and responsive to the determination that performance of the first job with characteristics that are similar to historical jobs that failed, rejecting, by the admission controller, the first new job request.

2. The CIM of claim 1 further comprising:
receiving a second new job request data set including information indicative of a second new job being requested to be performed by a cloud managed by a cloud management system;
determining, by the admission controller, that performance of the second new job by the cloud would not cause any of the following three thresholds to be exceeded: the stack limit threshold, the process identifiers threshold, and/or the file handlers threshold; and
responsive to the determination that performance of the second new job would cause none of the thresholds to be exceeded, accepting, by the admission controller, the second new job request.

3. The CIM of claim 2 further comprising:
responsive to the acceptance of the second new job request, performing the second new job by the cloud.

4. The CIM of claim 1 further comprising:
determining the selection of job characteristics that are associated with the second new job.

5. The CIM of claim 1 further comprising:
determining the similarity among jobs based on job characteristics.

6. The CIM of claim 1 further comprising:
determining the dissimilarity among jobs based on job characteristics and predefined rules.

7. A computer program product (CPP) comprising:
a machine readable storage device; and
computer code stored on the machine readable storage device, with the computer code including instructions for causing a processor(s) set to perform operations including the following:
receiving a first new job request data set including information indicative of a first new job being requested to be performed by a cloud managed by a cloud management system,
determining, by an admission controller of the cloud management system, that performance of the first new job by the cloud would cause failures that are not reflected in monitored parameters but are indicated by job characteristics, and
responsive to the determination that performance of the first job with characteristics that are similar to historical jobs that failed, rejecting, by the admission controller, the first new job request.

8. The CPP of claim 7, wherein the computer code further includes instructions for causing the processor(s) set to perform the following operations:
receiving a second new job request data set including information indicative of a second new job being requested to be performed by a cloud managed by a cloud management system;
determining, by the admission controller, that performance of the second new job by the cloud would not cause any of the following three thresholds to be exceeded: the stack limit threshold, the process identifiers threshold, and/or the file handlers threshold; and
responsive to the determination that performance of the second new job would cause none of the thresholds to be exceeded, accepting, by the admission controller, the second new job request.

9. The CPP of claim 8, wherein the computer code further includes instructions for causing the processor(s) set to perform the following operations:
responsive to the acceptance of the second new job request, performing the second new job by the cloud.

10. The CPP of claim 7, wherein the computer code further includes instructions for causing the processor(s) set to perform the following operations:
determining the selection of job characteristics that are associated with the second new job.

11. The CPP of claim 7, wherein the computer code further includes instructions for causing the processor(s) set to perform the following operations:
determining the similarity among jobs based on job characteristics.

12. The CPP of claim 7, wherein the computer code further includes instructions for causing the processor(s) set to perform the following operations:
determining the dissimilarity among jobs based on job characteristics and predefined rules.

13. A computer system (CS) comprising:
a processor(s) set;
a machine readable storage device; and
computer code stored on the machine readable storage device, with the computer code including instructions for causing the processor(s) set to perform operations including the following:
receiving a first new job request data set including information indicative of a first new job being requested to be performed by a cloud managed by a cloud management system,
determining, by an admission controller of the cloud management system, that performance of the first new job by the cloud would cause failures that are not reflected in monitored parameters but are indicated by job characteristics, and
responsive to the determination that performance of the first job with characteristics that are similar to historical jobs that failed, rejecting, by the admission controller, the first new job request.

14. The CS of claim 13, wherein the computer code further includes instructions for causing the processor(s) set to perform the following operations:
receiving a second new job request data set including information indicative of a second new job being requested to be performed by a cloud managed by a cloud management system;
determining, by the admission controller, that performance of the second new job by the cloud would not cause any of the following three thresholds to be exceeded: the stack limit threshold, the process identifiers threshold, and/or the file handlers threshold; and
responsive to the determination that performance of the second new job would cause none of the thresholds to be exceeded, accepting, by the admission controller, the second new job request.

15. The CS of claim 14, wherein the computer code further includes instructions for causing the processor(s) set to perform the following operations:
responsive to the acceptance of the second new job request, performing the second new job by the cloud.

16. The CS of claim 13, wherein the computer code further includes instructions for causing the processor(s) set to perform the following operations:
determining the selection of job characteristics that are associated with the second new job.

17. The CS of claim 13, wherein the computer code further includes instructions for causing the processor(s) set to perform the following operations:

determining the similarity among jobs based on job characteristics.

18. The CS of claim 13, wherein the computer code further includes instructions for causing the processor(s) set to perform the following operations:

determining the dissimilarity among jobs based on job characteristics and predefined rules.

* * * * *